United States Patent
Leonelli, Jr.

(10) Patent No.: US 10,277,786 B1
(45) Date of Patent: Apr. 30, 2019

(54) CAMERA MODULE ASSEMBLY FOR A MOTOR VEHICLE

(71) Applicant: AUTOLIV ASP, INC., Ogden, UT (US)

(72) Inventor: Frank Paul Leonelli, Jr., Goleta, CA (US)

(73) Assignee: VEONEER US, INC., Southfield, MI (US)

( * ) Notice: Subject to any disclaimer, the term of this patent is extended or adjusted under 35 U.S.C. 154(b) by 0 days.

(21) Appl. No.: 15/903,660

(22) Filed: Feb. 23, 2018

(51) Int. Cl.
*H04N 5/225* (2006.01)
*B60R 11/04* (2006.01)

(52) U.S. Cl.
CPC ......... *H04N 5/2252* (2013.01); *H04N 5/2254* (2013.01); *B60R 11/04* (2013.01)

(58) Field of Classification Search
CPC ........................................................ B60R 11/04
See application file for complete search history.

(56) References Cited

U.S. PATENT DOCUMENTS

| | | | |
|---|---|---|---|
| 7,329,869 B2 | 2/2008 | Cassel et al. | |
| 7,542,220 B2 | 6/2009 | Chan | |
| 7,566,177 B2 * | 7/2009 | Thompson | F16M 11/10 396/427 |
| 7,734,171 B2 | 6/2010 | Leonelli, Jr. | |
| 7,744,296 B2 | 6/2010 | Wu et al. | |
| 8,482,664 B2 * | 7/2013 | Byrne | B60R 1/00 348/373 |
| 8,717,487 B2 | 5/2014 | Azuma | |
| 9,160,908 B2 * | 10/2015 | Mori | H04N 5/2252 |
| 9,294,661 B2 | 3/2016 | Choi et al. | |
| 9,392,147 B2 | 7/2016 | Lee | |
| 9,749,508 B2 * | 8/2017 | Ahn | G03B 17/02 |
| 9,751,155 B2 * | 9/2017 | Wang | B23K 26/21 |
| 2002/0101041 A1 * | 8/2002 | Kameyama | H01R 13/521 277/628 |
| 2011/0217034 A1 | 9/2011 | You et al. | |
| 2013/0293771 A1 * | 11/2013 | Mori | H04N 5/2252 348/374 |

FOREIGN PATENT DOCUMENTS

| | | |
|---|---|---|
| DE | 102015114198 | 3/2017 |
| KR | 20090047307 | 5/2009 |

* cited by examiner

*Primary Examiner* — Gary C Vieaux
(74) *Attorney, Agent, or Firm* — Brinks Gilson & Lione

(57) ABSTRACT

A camera module assembly includes a camera core disposed with an outer housing. The outer housing includes a front shell with a window and a rear shell. The camera core includes a lens assembly, and sensor assembly, and a sensor housing. The sensor assembly is disposed within the sensor housing, and the sensor housing is fixed to the lens assembly. The sensor housing includes a plurality of grommets disposed within an interior cavity, and the sensor assembly is pressed against the grommets to hold the sensor assembly in place within the sensor housing and relative to the lens assembly when the sensor housing is fixed to the lens assembly. The camera core is inserted into the front shell against rubber bumpers, and the rear shell is fixed to the front shell to close the outer housing.

18 Claims, 16 Drawing Sheets

CAMERA MODULE ASSEMBLY FOR A MOTOR VEHICLE

FIELD OF THE INVENTION

The invention relates to a camera module and, more particularly, to a camera module assembly for a motor vehicle.

BACKGROUND

Automotive camera modules may be used for various purposes, such as for assisting drivers in the detection of obstacles, animals, pedestrians, and other vehicle surroundings. Camera modules may be used as part of a driver-assist system or in autonomous vehicles. One type of camera module can include a thermal imaging night vision camera that attaches to the front end of vehicles to assist drivers in pedestrian and animal detection at night.

Camera modules may include a number of components that are assembled together into a single module or unit for installation on the vehicle at a later time. For example, a camera module may include a camera core assembly that is assembled together and secured within an outer housing assembly.

The camera core assembly may include a lens assembly, a sensor assembly, and a sensor housing, all of which are secured together to define the camera core assembly. The outer housing assembly may include a first housing and a second housing that are secured to each other and that surround and house the core assembly therein. The first housing may include a passageway for a wire harness connected to the sensor electronics to pass into the housing. The second housing may include a window and shutter adjacent the lens assembly.

The camera core has been typically assembled into a single unit prior to assembly with the outer housing. The camera core is pre-assembled to allow the lens focusing procedure to be performed prior to installation within the outer housing.

Due to the number of components of the camera core and the pre-assembled state of the camera core prior to installation with the outer housing, the camera core assembly can typically include a high number of screws. In one example, 13 screws are used to assemble the camera core assembly into its pre-assembled state. Additional screws are necessary to secure the pre-assembled camera core assembly to either the first housing or the second housing, and further screws may be used to secure the first housing to the second housing.

The number of components to be assembled and screwed together in such a camera module results in high manufacturing costs and a high number of materials, as well as a high amount of time to fully assemble the camera module.

The present invention provides a more cost effective and simpler manner of assembly that reduces the number of screws in the assembly while maintaining the camera module and its assembled components in the desired secured positions relative to each other.

SUMMARY

A camera module assembly is provided, including: an outer housing including a front first shell and a rear second shell; wherein the first shell includes a closed end and an open end opposite the closed end, a body extending between the open end and the closed end and defining an interior cavity having a central longitudinal axis, and a base portion disposed at the open end, the base portion defining a plurality of mounting holes therein.

The assembly further includes a camera core assembly including a lens assembly, a sensor assembly, and a sensor housing. The lens assembly has a lens housing and a lens module mounted within the lens housing, the lens assembly having a front end and a rear end, the front end disposed within the cavity of the first outer housing adjacent the closed end, the rear end having a base portion with a plurality of mounting holes therein.

The sensor assembly is disposed adjacent the base of the lens assembly and defines a plurality of grommet recesses. The sensor housing has a body with a front end and a rear end and an interior cavity, the body defining a plurality of mounting holes corresponding to the mounting holes of the lens assembly, wherein the sensor assembly is disposed within the sensor housing, and the body of the sensor housing is disposed against the lens assembly.

A plurality of grommets are disposed within the cavity of the sensor housing, the grommets distributed to correspond to the grommet recesses of the sensor assembly, wherein attachment of the sensor housing to the lens assembly compresses the grommets into the grommet recesses.

The second shell has a front end and a rear end, the front end defining a front opening, the second shell defining an interior cavity, wherein the sensor housing is disposed within the interior cavity of the second shell. The second shell has a base portion disposed at the front end, the base portion defining a plurality of mounting holes corresponding to the mounting holes of the base portion of the first shell. The camera core is held in place within the first shell and the second shell when the first and second shell are fastened together.

In one form, the assembly further comprises a plurality of bumper members disposed within the interior cavity of the first shell and adjacent a front facing surface of the lens assembly. The assembly may include a sealing member extending along a rear surface of the base portion of the first shell and disposed between the first shell and the second shell. The second shell may include a port formed in the rear end thereof for providing access to the interior of the cavity of the second shell.

In one approach, the lens module of the lens assembly is longitudinally adjustable relative to the lens housing to adjust the focus of the lens assembly, wherein the lens module is fixable relative to the lens housing.

The assembly may also include a window disposed at the closed end of the first outer housing. The assembly may include a heater extending from the closed end of the first outer housing to the rear end of the sensor module, wherein the heater transfers heat from the sensor module to the closed end of the first outer housing.

In one form, the grommet recesses have a semi-cylindrical shape. The grommets may have a front end, and the front end has a bulbous shape.

In one approach, the lens assembly may include a shutter assembly attached to the rear end of the lens housing, and the sensor assembly contacts the shutter assembly when the camera core is assembled. In one form, the lens housing includes at least one pin extending rearwardly and toward the shutter assembly, and the shutter assembly includes at least one hole corresponding to the at least one pin, wherein the at least one pin of the lens housing is received in the at least one hole of the shutter assembly. The shutter assembly may include at least one pin extending rearwardly and toward the sensor housing, and the sensor housing includes at least one hole corresponding to the at least one pin, wherein the at least on pin of the shutter assembly is received in the at least one hole of the sensor housing.

In one form, the first shell includes at least one pin extending rearwardly, and the lens housing of the camera core includes at least one hole corresponding to the at least one pin of the first shell, wherein the at least one pin of the first shell is received in the at least one hole of the lens housing.

The assembly may further include a rear circuit board disposed between the sensor assembly and the rear end of the second shell, wherein the rear circuit board connects to the sensor assembly via corresponding connectors. The rear circuit board may include a rearwardly protruding connector, and the connector extends through a port formed in the rear end of the second shell.

In one approach, the assembly further includes a plurality of first fasteners having a head portion and a shaft portion, the first fasteners extending through the mounting holes of the sensor assembly and the lens assembly in a first direction, such that the head portion is disposed at the rear end of the sensor housing and the shaft portion attaches the lens module to the sensor housing. Additionally, the assembly may include a plurality of second fasteners having a head portion and a shaft portion, the second fasteners extending through the mounting holes of the first and second shells in the same direction as the first fasteners, such that the head portion is disposed at a rear surface of the base portion of the second outer housing, and the shaft portion attaches the second shell to the first shell.

In another example, a camera core assembly is provided and includes a lens assembly, a sensor assembly, and a sensor housing. The lens assembly has a lens housing and a lens module mounted within the lens housing, the lens assembly having a front end and a rear end, the rear end having a base portion with a plurality of mounting holes therein. The lens assembly includes a shutter assembly attached to the base portion. The sensor assembly is disposed adjacent the shutter assembly.

The sensor housing has a body with a front end and a rear end and an interior cavity, the body defining a plurality of mounting holes corresponding to the mounting holes of the lens assembly, wherein the sensor assembly is disposed within the sensor housing, and the body of the sensor housing is disposed against the shutter assembly.

A plurality of grommets are mounted within the cavity of the sensor housing, wherein the sensor assembly includes a sensor frame defining a plurality of grommet recesses corresponding to the grommets of the sensor housing. The grommets are compressed between the sensor frame and the sensor housing when the sensor housing is attached to the lens assembly.

In one form, the lens housing includes at least one pin and the shutter assembly includes at least one hole correspond to the at least one pin of the lens housing, the shutter assembly includes at least one pin and the sensor frame includes at least one hole corresponding to the at least one pin of the shutter assembly, wherein the at least one pin of the lens housing is received in the at least one hole of the shutter assembly, and the at least one pin of the shutter assembly is received in the at least one hole of the sensor frame.

In another example, a method for assembling a camera module is provided, the method including the steps of: providing a sensor housing having an open front end and defining an interior cavity, the sensor housing including a plurality of grommets distributed within the interior cavity; inserting a sensor assembly into the sensor housing, the sensor assembly including a sensor frame having a plurality of grommet recesses corresponding to the plurality of grommets, and contacting the grommets with the sensor frame; placing a lens assembly against the sensor assembly; compressing the lens assembly and the sensor housing together when the sensor assembly is disposed within the sensor housing and, in response thereto, compressing the grommets and fixing the sensor assembly relative to the lens assembly; inserting the lens assembly into a front shell of an outer housing, wherein the front shell includes at least one rubber bumper, wherein a front surface of the lens assembly contacts the at least one rubber bumper; inserting the sensor assembly into a rear shell of the outer housing; and fixing the front shell to the rear shell when the lens assembly and the sensor assembly are disposed therein.

The method may further include attaching a rear circuit board to a rear end of the sensor assembly and attaching a heater connected to a window of the front shell to the rear circuit board.

BRIEF DESCRIPTION OF THE DRAWINGS

In the following the invention shall be illustrated on the basis of preferred embodiments with reference to the accompanying drawings, wherein.

DETAILED DESCRIPTION

Figure 1:
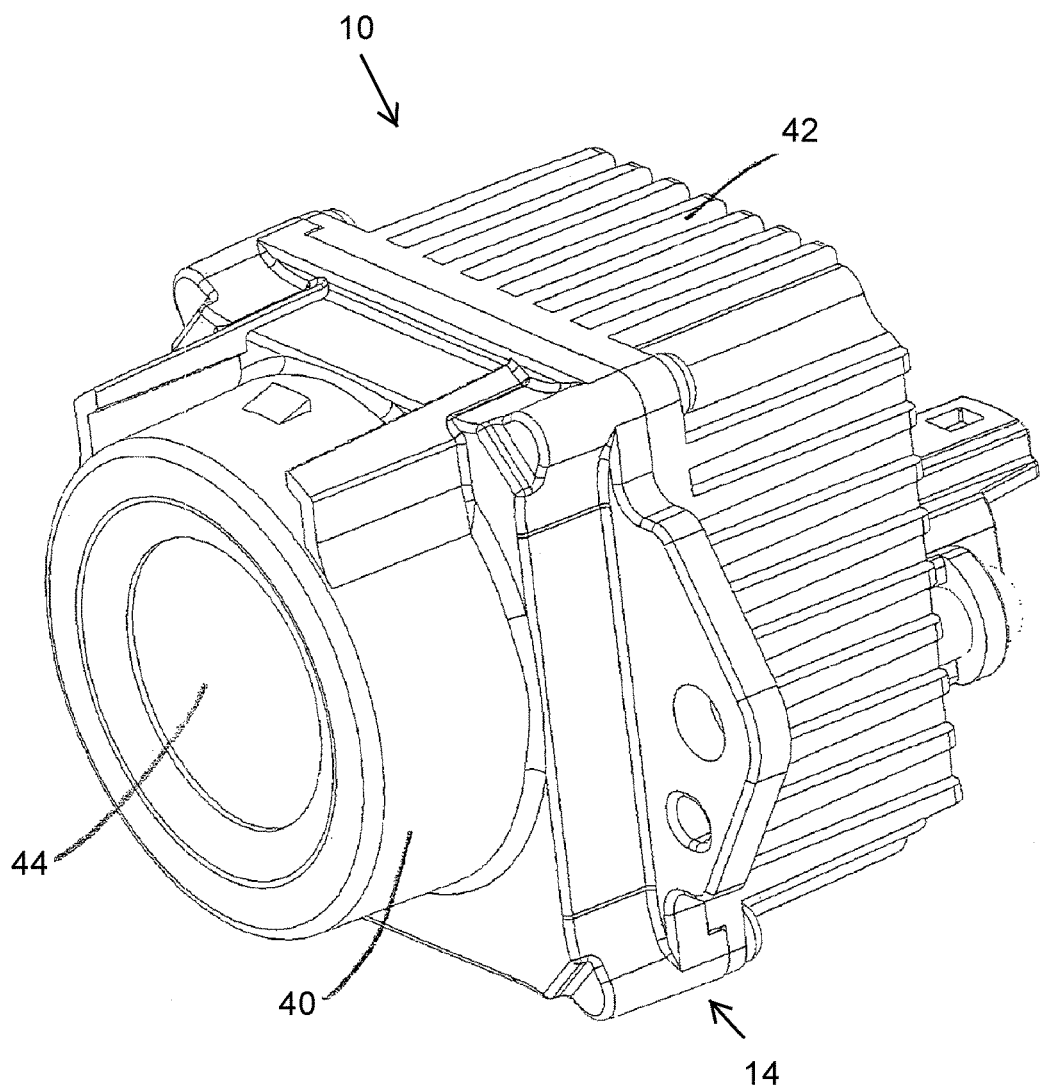
FIG. 1 is a perspective view of a camera module assembly including an outer housing having a front shell and a rear shell.
Figure 2:
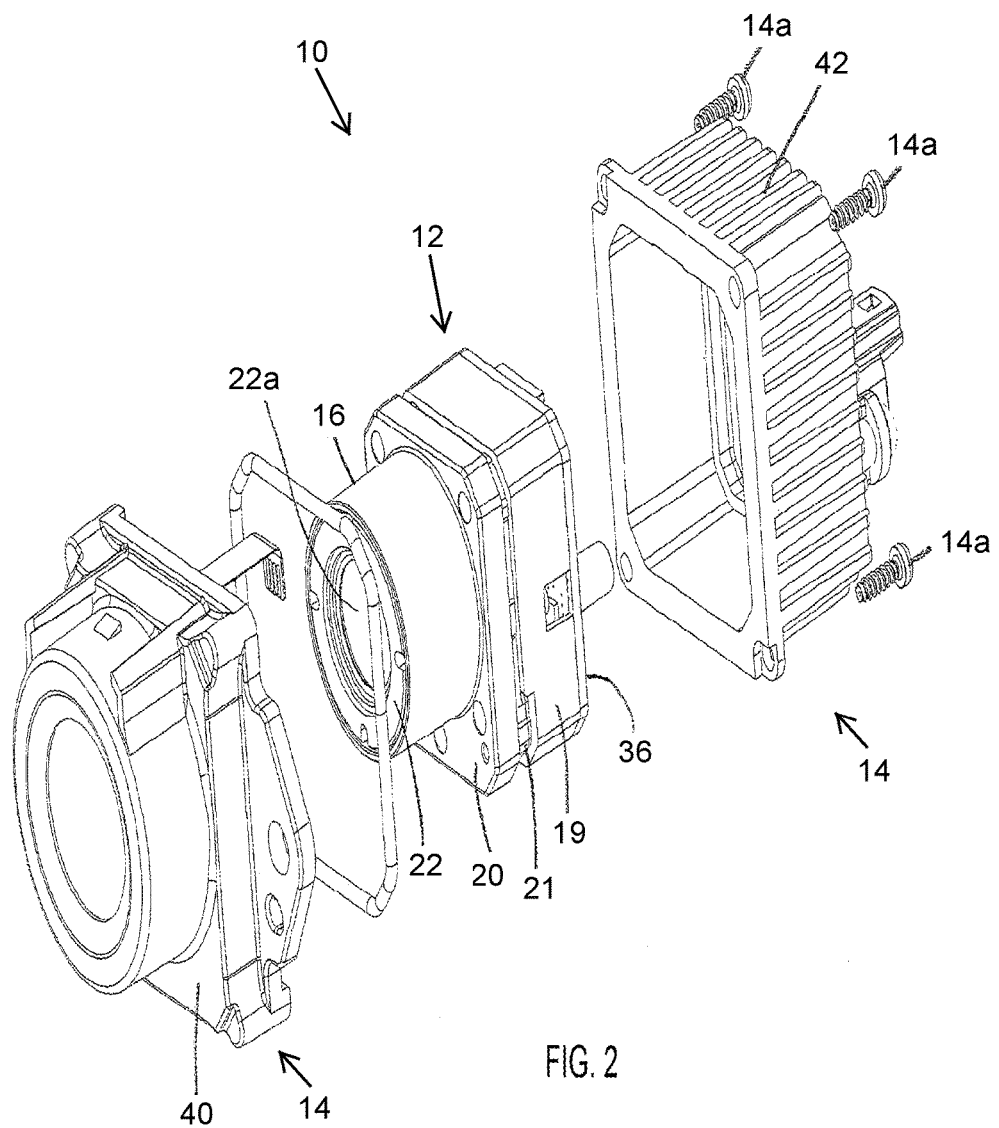
FIG. 2 is an exploded view of the camera module, illustrating a camera core assembly that is disposed within the outer housing when assembled.

With reference to FIGS. 1 and 2, a camera module assembly 10 is shown. The camera module 10 may be mounted to a motor vehicle and connected to a motor vehicle computing system in a manner known in the art.

The camera module 10 includes an assembled camera core 12 and an assembled outer housing 14 that surrounds the camera core 12. The camera core 12 is disposed within the outer housing 14, such that the outer housing 14 surrounds and encloses the camera core 12 therein.

The camera core 12 generally includes the imaging components of the camera module 10 that receive and capture the images within the field of view of the camera module 10. The camera core 12 may be connected to the vehicle controller via a wire harness (not shown) that extends out of the housing 14 and is routed to the vehicle controller for communication therewith.

Figure 3:
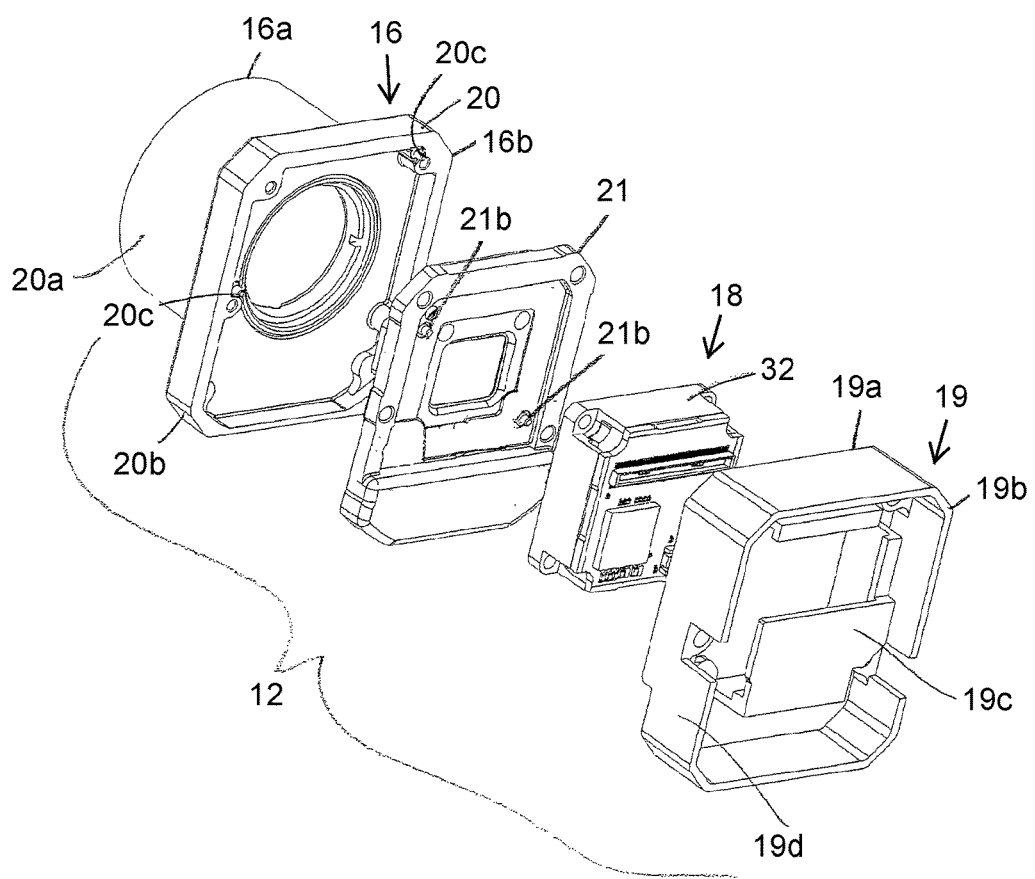
FIG. 3 is an exploded view of the camera module, illustrating a lens assembly having a lens housing and a lens module disposed therein, a shutter assembly, a sensor assembly, and a sensor housing.
Figure 4:
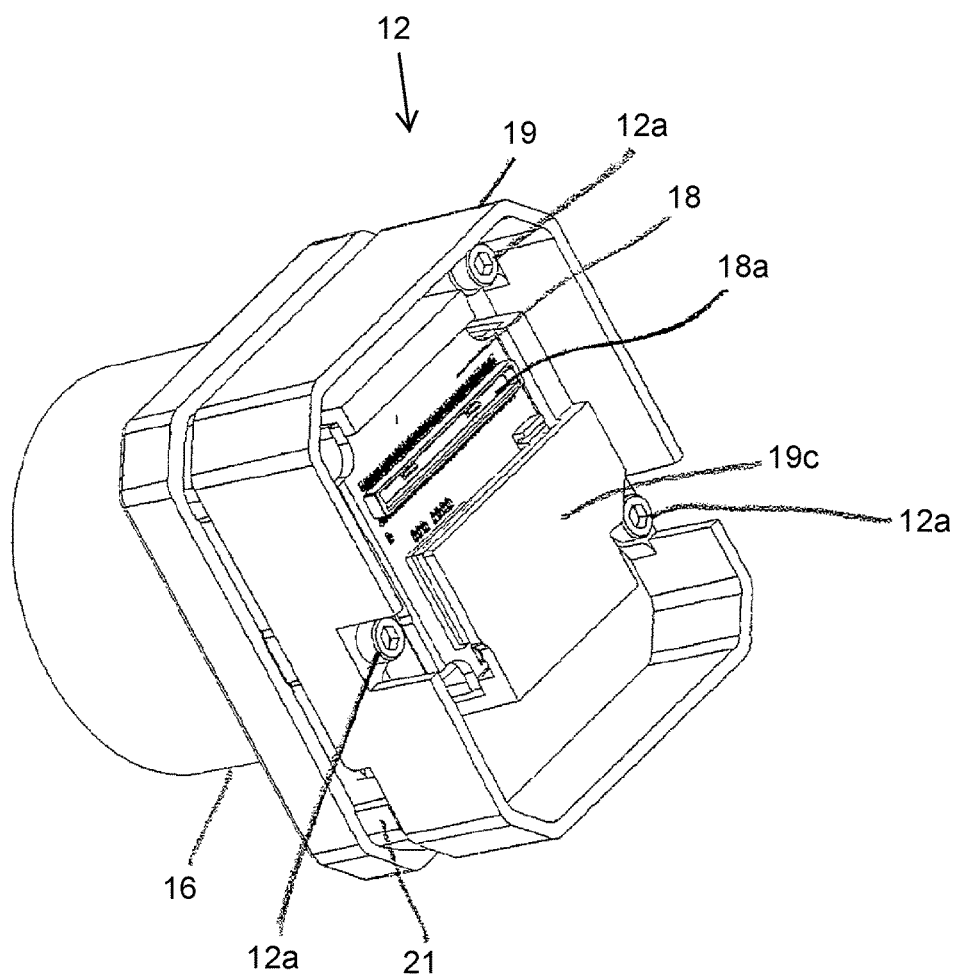
FIG. 4 is a rear perspective view of the assembled camera core.

With reference to FIGS. 3 and 4, the camera core 12 includes a lens assembly 16, a sensor assembly 18, and a sensor housing 19. The lens assembly 16 includes a lens housing 20 and a lens module 22 that can be threadably secured to each other. The lens assembly 16 may further include a shutter assembly 21 attached to the lens housing 20. The lens assembly 16 has a first front end 16a, where light will enter the lens assembly 16, and a second rear end 16b opposite the first end, where the shutter assembly 21 is disposed.

Figure 5:
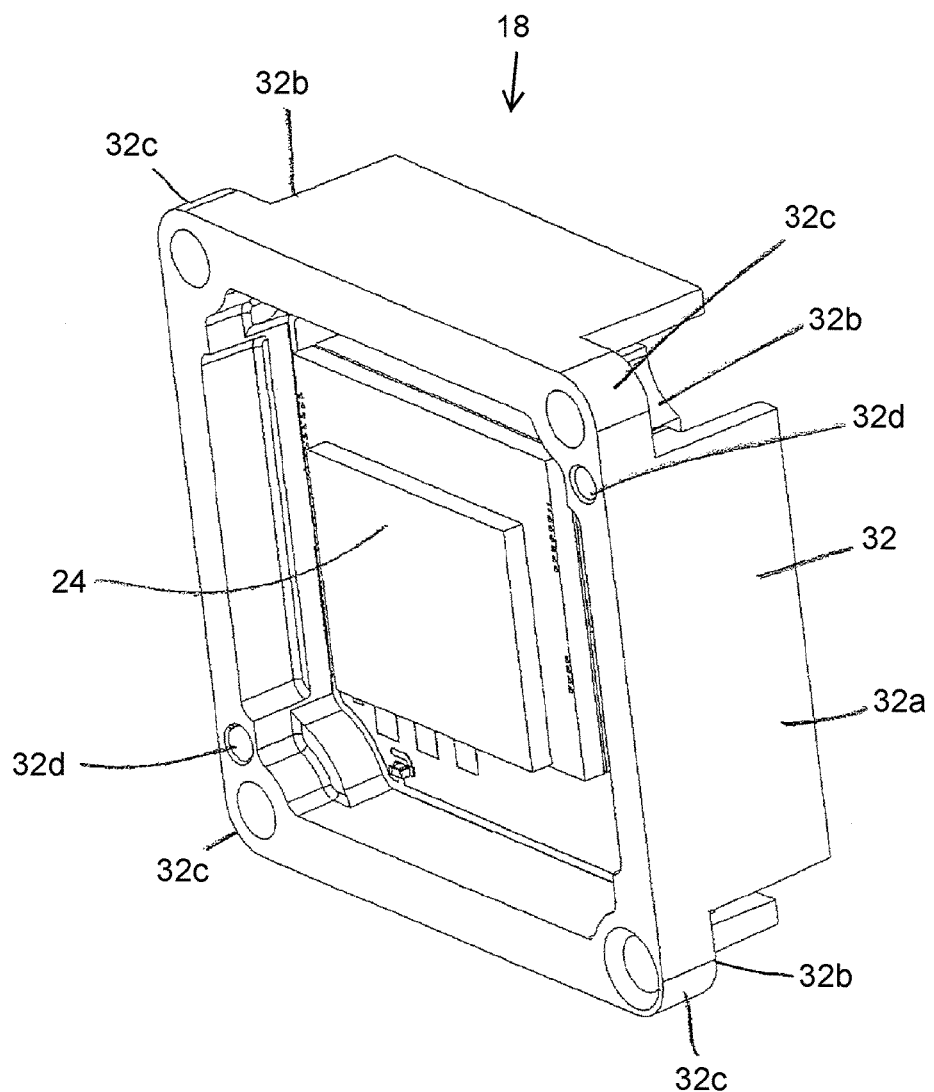
FIG. 5 is a front perspective view of the sensor assembly, illustrating a sensor unit and a sensor frame.

As shown in FIG. 5, the sensor assembly 18 includes a sensor unit 24 and various electrical and processing components known in the art, where the sensor assembly 18 is at least partially disposed in the sensor housing 19 when the camera core 12 is assembled.

The lens assembly 16 is adjustable to adjust its focus relative to the sensor assembly 18. In one approach, with reference to FIGS. 2 and 3, the lens module 22 includes a lens 22a at its outer end (or multiple lenses within the lens module 22), and the lens module 22 may be threaded into a tubular sidewall 20a of the lens housing 20. The lens 22a may be rotationally and axially fixed as part of the lens module 22, such that the threading of the lens module 22 into the lens housing 20 will rotate and axially translate the lens 22a relative to the lens housing 20. The axial translation of the lens 22a will adjust its focus relative to the sensor unit 24. The lens module 22 may be fixed in place relative to the lens housing 20 after being adjusted to the desired focus.

The lens assembly 16, including the lens module 22 and the lens housing 20, is generally hollow or open inside, thereby allowing the light that passes through the lens 22a to pass through the lens assembly 16 such that images can be detected by the sensor unit 24. The sensor unit 24 is disposed at the end of the lens assembly 16 opposite the lens 22a when the camera core 12 is assembled. More particularly, the sensor unit 24 is disposed adjacent the shutter assembly 21, which is attached to the end of the lens housing 20 opposite the lens 22a.

The lens housing 20 may include a base 20b that defines a recess facing toward the sensor assembly 18, and the shutter assembly 19 may be partially disposed within the recess defined by the base 20b of the lens housing 20. Thus, when the sensor assembly 18 is disposed between the lens assembly 16 and the sensor housing 19, the sensor assembly 18 is disposed adjacent the shutter assembly 21.

With reference again to FIG. 3, the sensor assembly 18 is disposed between the lens assembly 16 and the sensor housing 19. The sensor assembly 18 is held in place between the lens assembly 16 and the sensor housing 19 without the use of screws or other fixing-type fasteners, adhesives, or the like. Rather, the sensor assembly 18 is held in place between the lens assembly 16 and the sensor housing 19 by sandwiching the sensor assembly 18 between them. In a prior approach, the sensor assembly 18 was fastened to the sensor housing 19 via the use of screws. By omitting the screws, the sensor assembly 18 may be assembled with the lens assembly 16 and the sensor housing 19 to form the camera core 12 more quickly and with fewer parts.

However, as described above, it is desirable to focus the lens assembly 16 to the optimal focus. To focus the lens assembly 16, the lens assembly 16 is positioned and fixed relative to the sensor assembly 18, and the images detected by the sensor assembly 18 are used to focus the lens assembly 16. As such, to focus the lens assembly 16 using the sensor assembly 18, the two components must stay in the same position after focusing. If the sensor assembly 18 were to shift relative to the lens assembly 16 after focusing, then the lens assembly 16 may need to be refocused again. The prior solution of using screws to fasten the sensor assembly to the sensor housing, and then using screws to fasten the sensor housing to the lens assembly, would result in a generally fixed relative positioning between the lens assembly and the sensor assembly.

Figure 6:
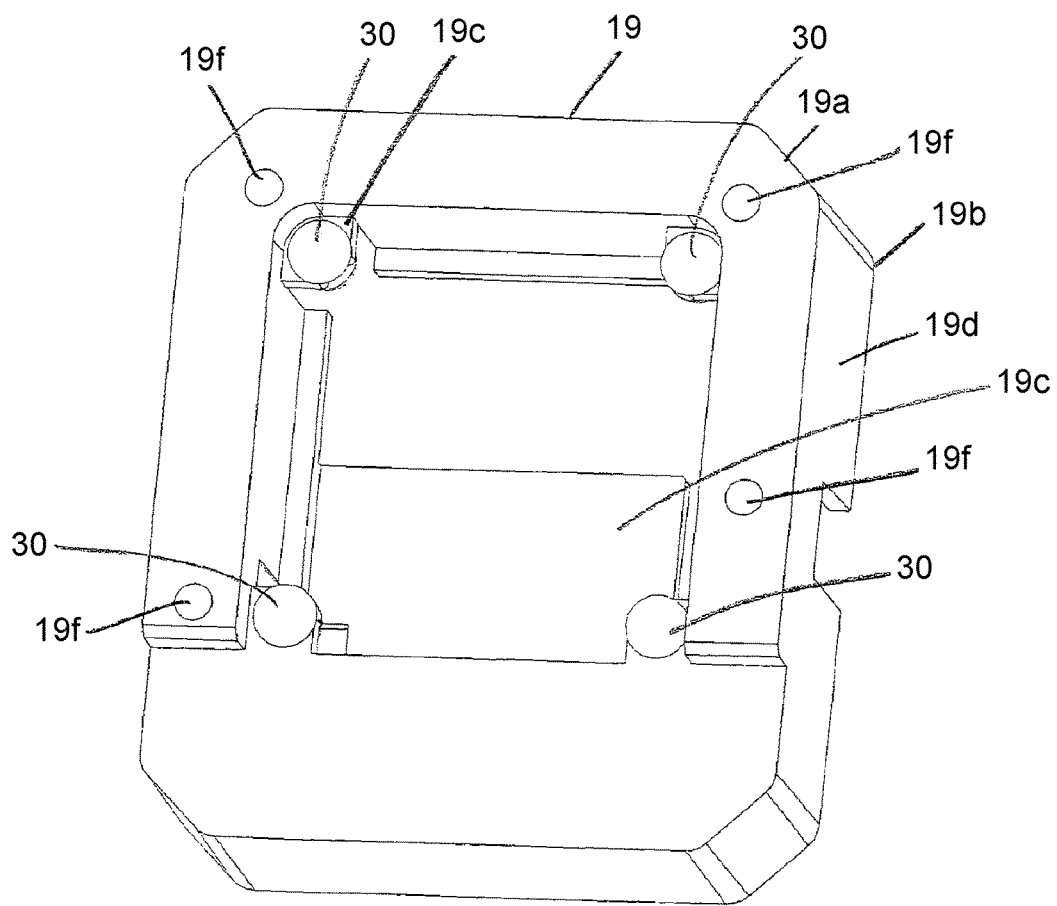
FIG. 6 is a front perspective view of the sensor housing, including a plurality of grommets.
Figure 7:
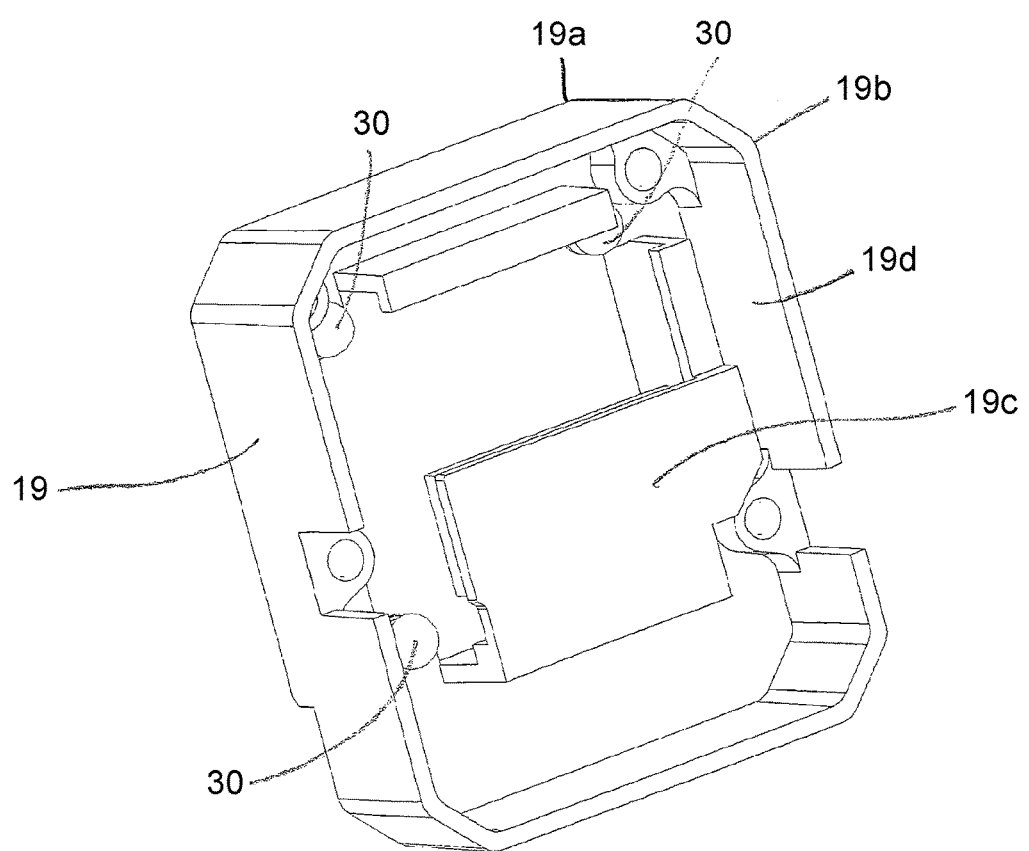
FIG. 7 is a rear perspective view of the sensor housing.

With reference to FIGS. 6 and 7, in the present example, the sensor assembly 18 is held in place relative to the lens assembly 16 via the use of flexible and resiliently biased grommets 30 disposed between the sensor assembly 18 and the sensor housing 19. The grommets 30 are compressed between the sensor assembly 18 and the sensor housing 19 during assembly of the camera core 12, thereby generating a reaction force that presses the sensor assembly 18 against the lens assembly 16 and retains the sensor assembly 18 in place relative to the lens assembly 16.

The grommets 30 may be disposed at multiple locations around the sensor assembly 18. In one approach, the grommets 30 may be located at four corners of the sensor assembly 18 when assembled. The grommets 30 are preferably disposed on and attached to the sensor housing 19, thereby defining a mounting pattern upon which the sensor assembly 18 may be placed during assembly.

The sensor housing 19 may have a block-like shape with a front end 19a disposed adjacent the lens assembly 16 and a back end 19b disposed away from the lens assembly 16. The front end 19a and the back end 19b both define openings. The sensor assembly 18 is inserted into the sensor housing 19 through the front end 19a. The back end 19b provides access for connections between the sensor assembly 18 and further components of the camera module 10.

The sensor housing 19 includes a shelf 19c disposed near the back end 19b. The shelf 19c is arranged to lie adjacent a rear end of the sensor assembly 18 when the sensor assembly 18 is positioned within the sensor housing 19. The shelf 19c therefore covers a portion of the sensor assembly 18 when the sensor assembly 18 is disposed within the sensor housing 19. The shelf 19c may include cutouts or openings to expose portions of the sensor assembly 18, for example connectors or other components of the sensor assembly 18 where access to the exposed portion is desired.

The sensor housing 19 includes a sidewall portion 19d with an outer profile and an inner profile, with the shelf 19c disposed within the inner profile. The sidewall portion 19d, and the inner profile thereof, is sized and arranged to correspond to the size and shape of the sensor assembly 18, such that the sensor assembly 18 may be securely located within the sensor housing 20. In one approach, the sidewall portion 19d defines a generally rectangular shape, corresponding to a rectangular outer profile of the sensor assembly 18.

The sensor housing 19 further includes a set of flanges 19e extending into the area within the sidewall portion 19d. The flanges 19e are arranged to hold the grommets 30 that are used to secure the sensor assembly 18. The flanges 19e are disposed near the front end 19a of the sensor housing 19. Thus, when the sensor assembly 18 is disposed within the sensor housing 19, a portion of the sensor assembly 18 will extend past the flanges 19e and toward the rear end 19b and the shelf 19c.

In one approach, the flanges 19e may include a notch, such that the grommets 30 may be pressed into the notch to be held in place. However, it will be appreciated that the grommets 30 and the flanges 19e may have other forms. In one approach, the grommets 30 each include a pair of head portions and a neck portion extending between the head portions. The neck portion may be pressed into the notch of the flanges 19e, such that the bulbous head portions are disposed on opposite sides of the flanges 19e to secure the grommets 30 in place.

The sensor housing 19 operates to house the sensor assembly 18 and hold it in place relative to the lens assembly 16 by attaching the sensor housing 19 to the lens assembly 16 and the shutter assembly 21. Thus, the sensor housing 19 further includes a plurality of through holes 19f having a pattern matching a corresponding pattern on the lens assembly 16, and more particularly on the base 20b of the lens housing 20. The through holes 19f permit fasteners, such as screws, to be passed therethrough to hold the sensor housing 19 against the lens assembly 16, with the sensor assembly 18 retained within the sensor housing 19.

With reference to FIGS. 3 and 5, the sensor assembly 18 includes sensor hardware, including the sensor unit 24, printed circuit boards, and other known sensor components. The sensor assembly 18 also includes a sensor frame 32, which is the component that interfaces with the grommets 30 to hold the sensor assembly 18 in place within the sensor housing 19, and to which the sensor hardware is mounted. The sensor hardware therefore attaches to the sensor frame 32, which interfaces with the grommets 30 that are attached to the sensor housing 19.

The sensor frame 32 has a generally rectangular and box-like shape, having open ends. The open ends allows the sensor unit 24 to be exposed to the lens assembly 16 and shutter assembly 21, and for the sensor hardware to be connected to additional components and control structure and the rear open end. The sensor frame 32 includes a sidewall portion 32a that has a shape that generally corresponds to the shape of the sidewall portion 19d of the sensor housing 19. The sensor frame 32 further defines a plurality of recessed corners 32b or grommet recesses at each corner of the sensor frame, with a base flange 32c at the front end of each recessed corner 32b. The base flanges 32c are the portions of the sensor frame 32 that contact the grommets 30 when the sensor assembly 18 is disposed within the sensor housing 19.

Thus, the sidewall portion 32a extends rearward from the base flanges 32c. The recessed corners 32b allow the sensor frame 32 and the sensor assembly 18 to pass the grommets 30 during installation, up until the base flanges 32c contact the grommets 30.

The sensor frame 32 is the component of the sensor assembly 18 that contacts the lens assembly 16 and the shutter assembly 21. However, the interface between the sensor frame 32 and the lens assembly 16/shutter assembly 21 may not include grommets or other cushioning type components. When the sensor assembly 18 is compressed between the lens assembly 16 and the sensor housing 19, the grommets 30 are sufficiently flexible to provide the holding force between the sensor assembly 18 and the lens assembly 16 without damaging the interface between the lens assembly 16/shutter assembly 21 and the sensor assembly 18.

Accordingly, the camera core 12, including the lens assembly 16, the sensor assembly 18, the shutter assembly 21, and the sensor housing 19, can be assembled quickly and efficiently by simply placing the sensor assembly 18 within the sensor housing 19 and then attaching the sensor housing 19 to the lens assembly 16. The lens assembly 16, the shutter assembly 21, the sensor assembly 18, and the sensor housing 19 may be assembled at different times and then later provided together to be assembled into the camera core 12.

To assemble the camera core 12, the sensor housing 19 is provided along with the sensor assembly 18. The sensor assembly 18 is placed into the sensor housing 19, such that the sensor frame 32 will pass over the grommets 30 and into the sensor housing 19. The sensor frame 32 will then contact the grommets 30, and be generally held in place within the sensor housing 19, although the grommets 30 may not yet be compressed.

With the sensor assembly 18 disposed within the sensor housing 19, the sensor housing 19 may then be attached to the lens assembly 16. For purposes of discussion, the shutter assembly 21 may be considered part of the lens assembly 16. In one approach, the shutter assembly 21 is attached to the base 20 of the lens assembly 16, and may be considered a portion of the lens assembly 16.

Figure 10:
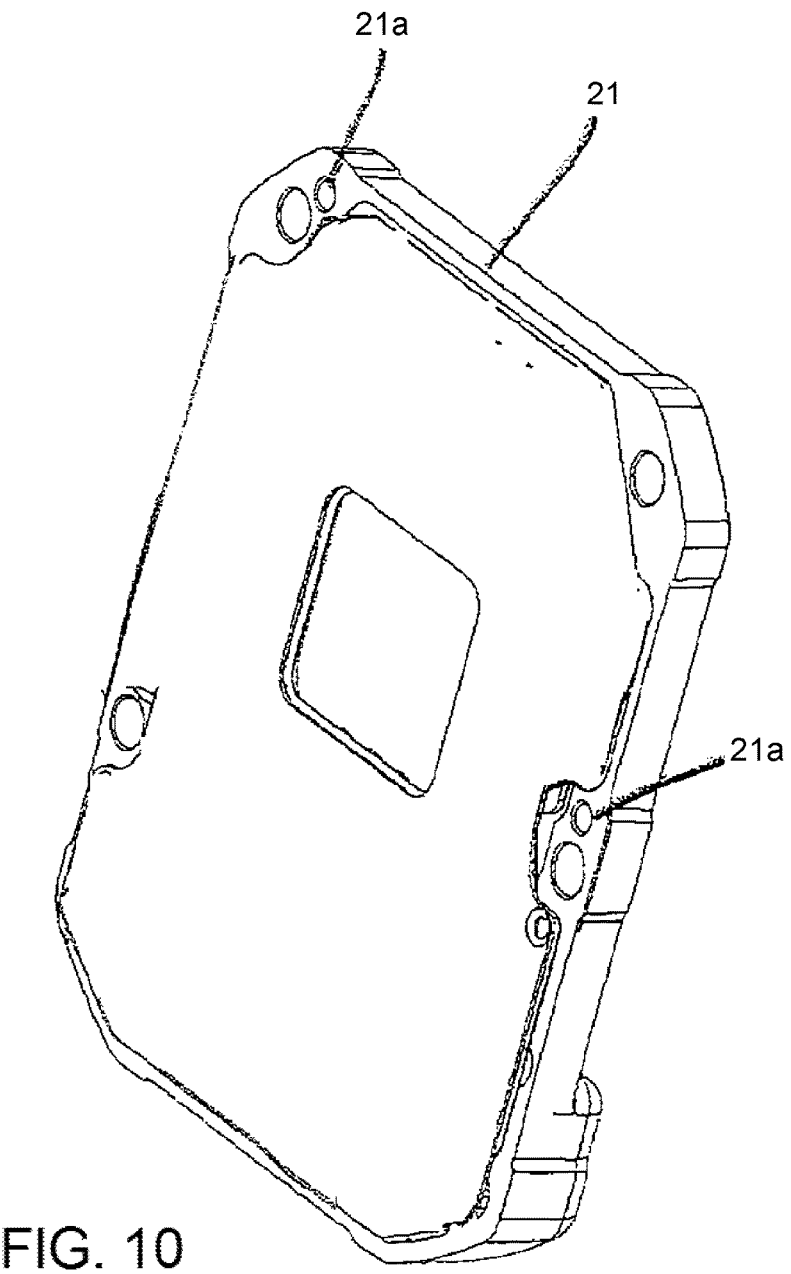
FIG. 10 is a front perspective view of the shutter assembly.
Figure 11:
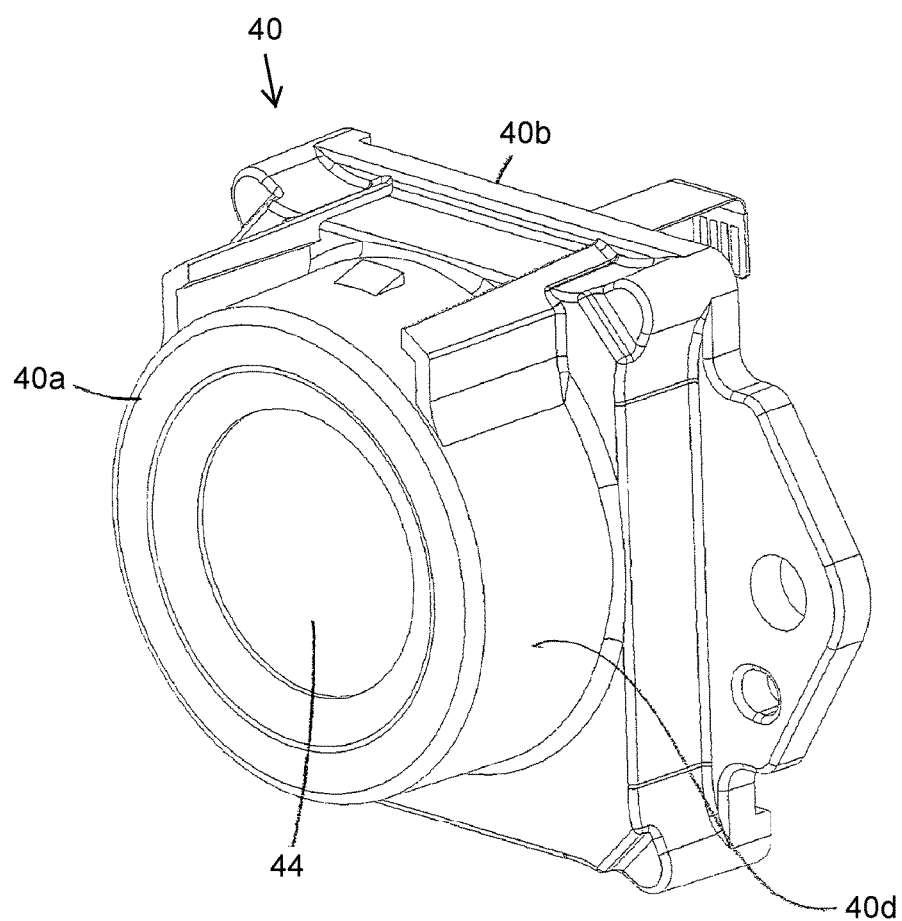
FIG. 11 is a front perspective view of the front shell of the outer housing.

As shown in FIG. 3, the lens housing 20 of the lens assembly 16 may include a pair of rearwardly extending pins 20c that extend toward the shutter assembly 21. The shutter assembly 21 may include a pair of holes 21a corresponding to the pins 20c of the lens housing 20, as shown in FIG. 10. Thus, to attach the shutter assembly 21 to the lens housing 20, the shutter assembly 21 may be pressed against the lens housing 20 such that the pins 20c engage with the holes 21a. The pins 20c may have a slight taper to create a press fit connection when the shutter assembly 21 is pressed against the lens housing 20.

As shown in FIG. 3, the shutter assembly 21 may also include rearward facing pins 21b that extend toward the sensor assembly 18. As shown in FIG. 5, the sensor frame 32 may include holes 32 arranged to correspond to the pins 21b of the shutter assembly 21. Thus, when the sensor assembly 18 is pressed against the lens assembly 16 and the shutter assembly 21, the pins 21b of the shutter assembly will be received in the holes 32d of the sensor frame 32. The pins 21b may be tapered to create a press-fit connection.

While the shutter assembly 21 has been described as being attached to the lens housing 20 and can be considered part of the lens assembly 16, the shutter assembly 21 may also be attached to the sensor frame 32 prior to being attached to the lens housing 20.

The shutter assembly 21 includes through holes that match the through-holes of the sensor housing 19, and permit passage of fasteners through the shutter assembly 21 and into the lens housing 20 to attach the sensor housing 19 to the lens housing 20.

The lens assembly 16 (with the shutter assembly 21 attached) may be provided, and the holes of the sensor housing 19 and the holes in the base 20 of the lens assembly 16 may be aligned. The sensor housing 19, having the sensor assembly 18 therein, may then be pressed against the lens assembly 16, at which point the sensor frame 32 will contact the lens assembly 16. As the sensor frame 32 is pressed against the lens assembly 16 and the sensor housing 19 is pressed toward the lens assembly 16, the grommets 30 disposed between the sensor frame 32 and the sensor housing 19 will become compressed. The grommets 30 will thereby provide a reaction force against the sensor frame 32, holding the sensor assembly 18 in place between the lens assembly 16 and the sensor housing 19.

With the sensor housing 19 pressed against the lens assembly 16, fasteners 12a (shown in FIG. 4), such as screws or bolts or the like, may be tightened to fix the sensor housing 19 to the lens assembly 16 and maintain the grommets 30 in the compressed state, providing the force on the sensor assembly 18 to retain it in place. The fasteners 12a may also be used to provide the initial pressing force that compressed the grommets 30.

With the camera core 12 in this assembled state, the camera core 12 may be attached to further components as well as being installed within the outer housing 14. The further components that may be attached to the camera core 12 prior to installation within the outer housing 14 may be common sensor components, such as additional circuit boards or other hardware.

Figure 8:
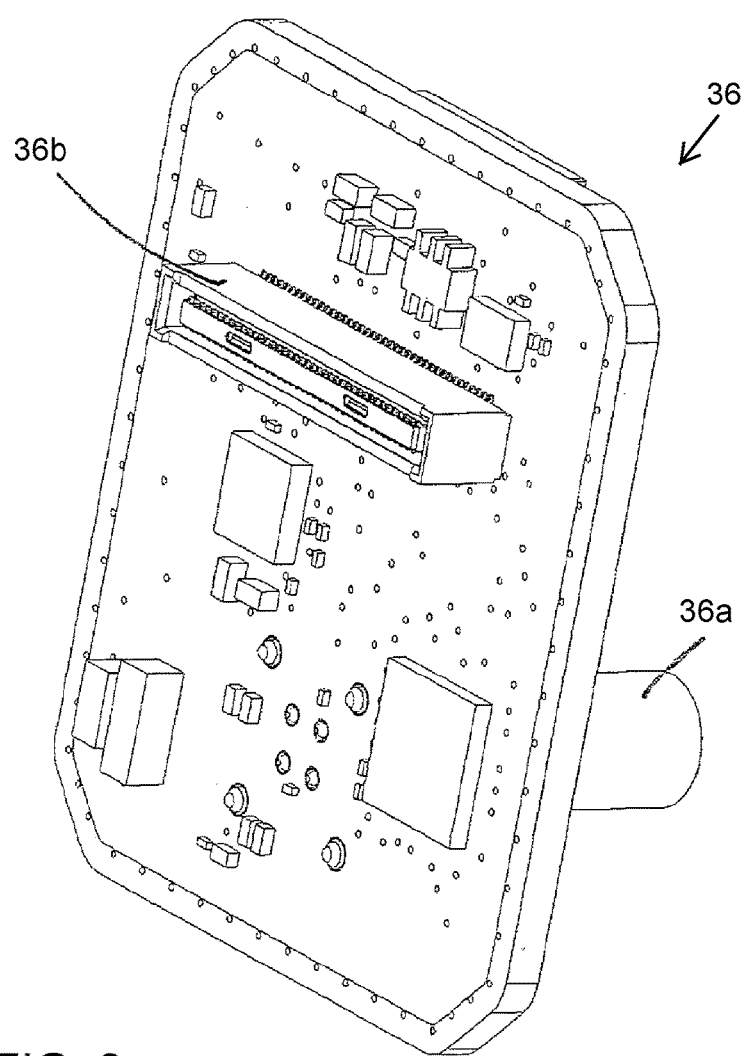
FIG. 8 is a front perspective view of a rear circuit board configured for being attached to the rear of the camera core.
Figure 9:
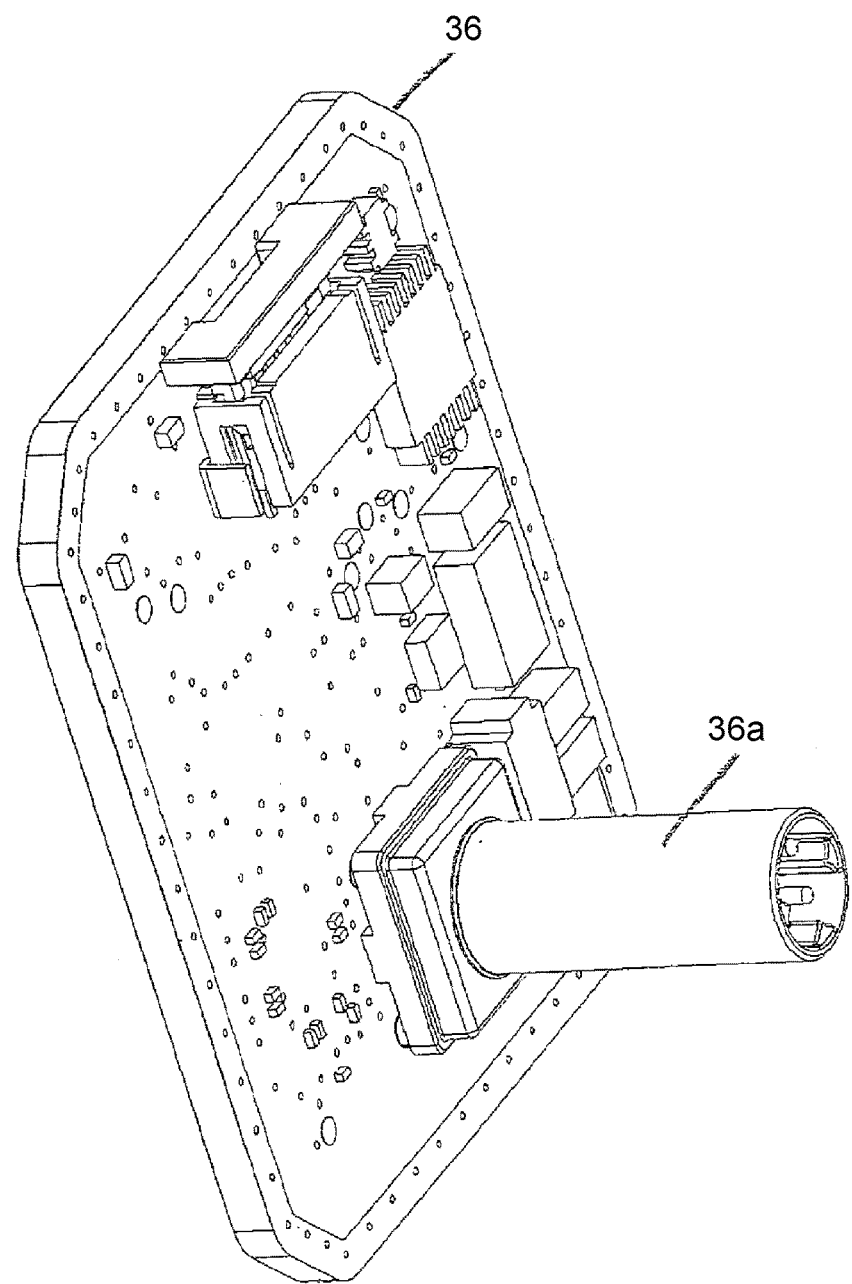
FIG. 9 is a rear perspective view of the rear circuit board.

In one approach, shown in FIGS. 2, 8, and 9, a rear circuit board 36 may be attached to the camera core 12 prior to installing the camera core within the outer housing 14. The rear circuit board 36 may be attached to the camera core 12 via a pin connector 18a (shown in FIG. 4) on the sensor assembly 18 that is accessible through the rear opening of the sensor housing 19. The rear circuit board 36 may itself include a connector in the form of a rearward protrusion 36a that is configured to interface with a controller of the motor vehicle, and may include a front connector 36b that is configured to connect to the rear connector 18a of the sensor assembly 18. The rear circuit board 36 is preferably attached to the camera core 12 prior to the camera core 12 being attached to the outer housing 14.

With reference again to FIGS. 1 and 2, as well as FIGS. 11-16, the outer housing 14 may be in a general two-piece form, although it will be appreciated that the two "pieces" may include multiple components. The outer housing 14 may include a front shell 40 and a rear shell 42, where the front shell 40 is configured to mate with the rear shell 42 to define the outer housing 14 and enclose the camera core 12 and associated attached components therein.

The front shell 40 is preferably attached to the rear shell 42 via fasteners 14a such as screws or bolts. The camera core 12 is disposed within the outer housing 14 without the use of screws to secure the camera core 12. Thus, the camera core 12 is secured simultaneously with the attachment of the rear shell 42 to the front shell 40.

With reference to FIGS. 11-14, the front shell 40 is the portion of the outer housing 14 that receives the front of the lens assembly 16. The front shell 40 therefore has a generally cylindrical shape, similar to the shape of the lens assembly 16. The front shell 40 has a front end 40a and a rear end 40b. The front end 40a is preferably closed, and the rear end 40b is open to receive the lens assembly 16 of the camera core 12 during assembly.

The rear end 40b includes a base flange 40c that is configured to mate with a corresponding flange of the rear shell 42. The base flange 40c includes a hole pattern configured to receive the fasteners that hold the rear shell 42 to the front shell 40.

The front shell 40 includes a generally cylindrical sidewall 40d that extends forward from the base flange 40c, with the sidewall 40d generally defining the interior recess into which the lens assembly 16 of the camera core 12 is received.

The front end of the sidewall 40d is preferably closed off with a transparent or semi-transparent window 44 configured to allow a predetermined amount of light to pass therethrough such that images may be captured via the camera. The front shell 40 may also include a window heater 46 that extends around the perimeter of the window 44 and then rearward out of the rear opening of the front shell 40. The rear terminal end of the heater 46 may be connectable to the rear circuit board 36 described above when ultimately assembled. The heater 46 operates to limit instances of the window 44 becoming covered with ice.

Figure 12:
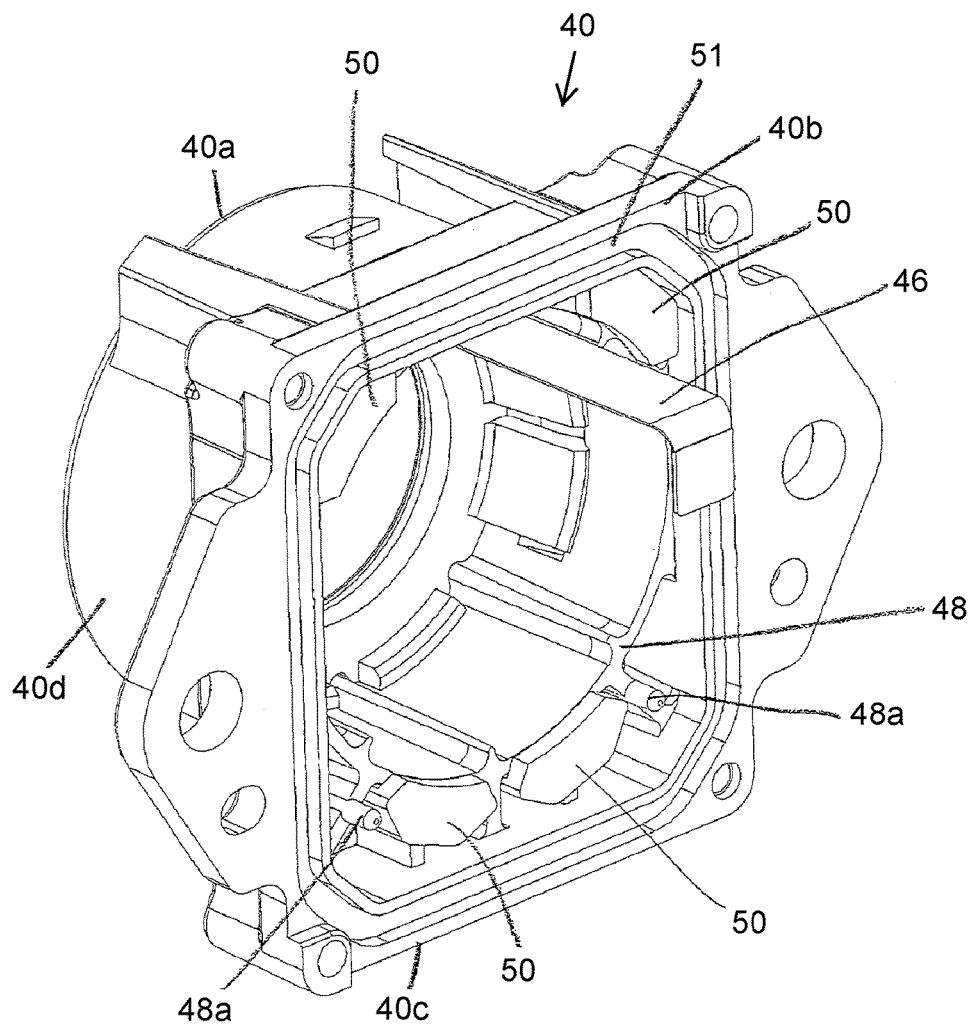
FIG. 12 is a rear perspective view of the front shell illustrating an interior cavity, a ledge having bumpers attached thereto, and a channel for a sealing ring.
Figure 13:
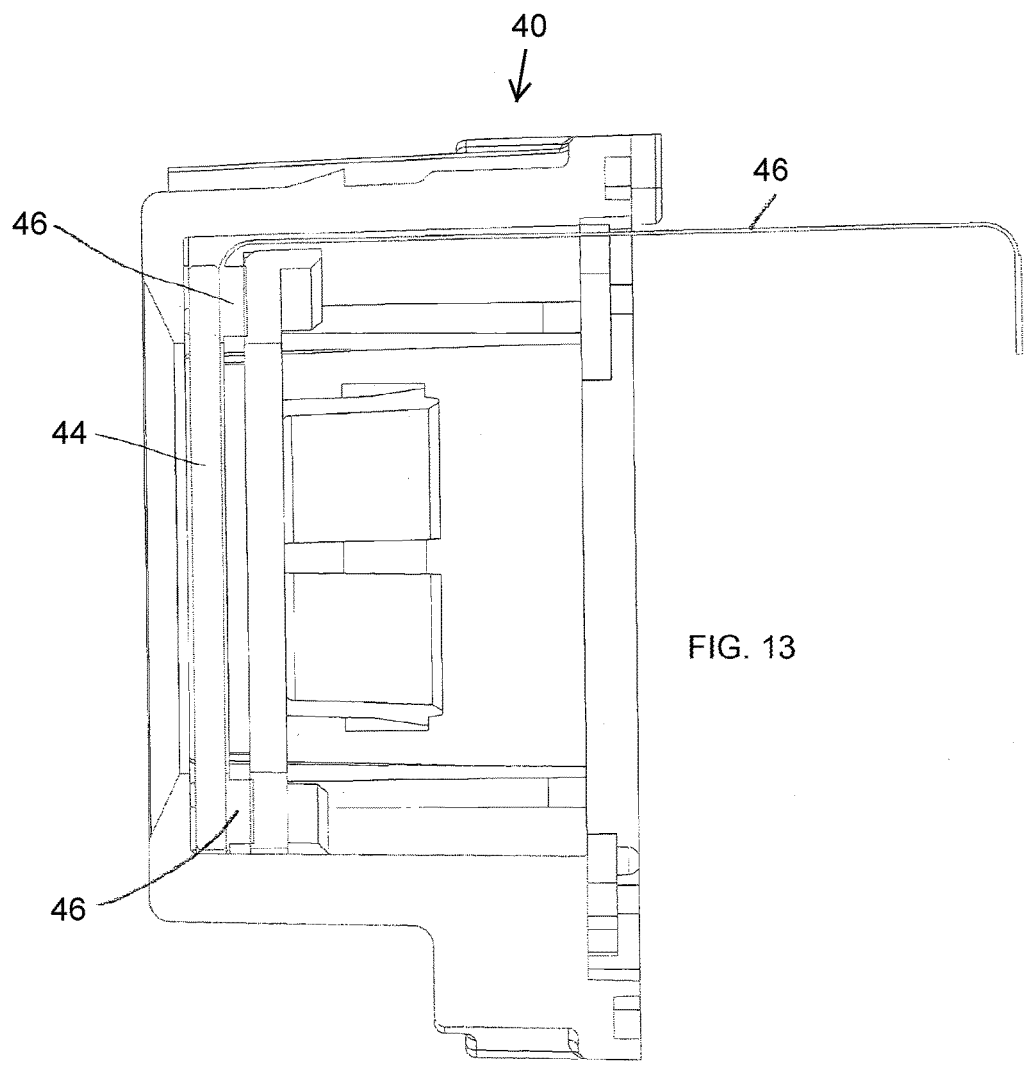
FIG. 13 is side cross-sectional view of the front shell illustrating a window heater that extends from a window at the front of the front shell and rearward for connection with the rear circuit board when assembled.

As shown in FIG. 12, the front shell 40 further includes an internal ledge 48 that is disposed near the rear opening of the front shell 40, and recessed inward relative to the base flange 40b. The ledge 48 provides a surface against which the lens assembly 16 may be disposed after insertion into the front shell 40. The ledge 48 therefore acts as a stop against the insertion of the lens assembly 16. In particular, the base of the lens housing 20 will be pressed against the ledge 48 when assembled. The ledge 48 may include cutouts or core-outs while still providing a sufficient surface against which the lens assembly 16 may be pressed.

Figure 14:
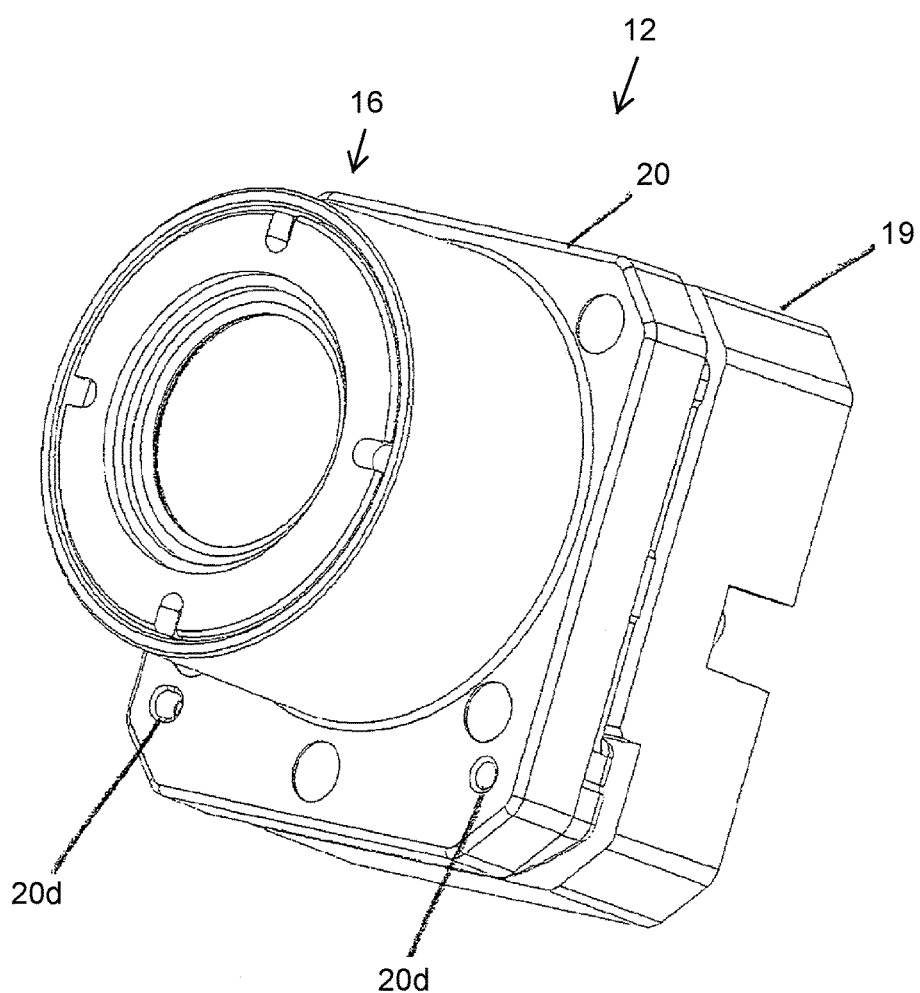
FIG. 14 is a front perspective view of the camera core illustrating holes in a front surface of the lens housing for mating with the front shell.

The ledge 48 may include a pair of pins 48a extending rearward and toward the camera core 12 and the lens housing 20. As shown in FIG. 14, the lens housing 20 of the camera core 12 may include a pair of holes 20d facing forward that correspond to the pins 48a of the front shell 40. When the camera core 12 is installed within the front shell 40, the pins 48a will be received in the holes 20d. The pins 48a may be tapered and provide a press-fit connection.

The ledge 48 includes a plurality of flexible and resilient bumpers 50. The bumpers 50 are disposed on the ledge 48 and are arranged to contact the lens housing 20 when the camera core 12 is placed within the front shell 40 and ultimately compressed against the front shell 40 during assembly. The bumpers 50 are resilient and provide a reaction force against the camera core 12 during assembly, thereby forcing the camera core 12 rearward toward the rear shell 42, and pressing the camera core between the front shell 40 and rear shell 42 to hold the camera core in place. In one approach, there are four bumpers 50 disposed on the ledge 48.

Two bumpers 50 may be arranged in the upper corners of the ledge 48, while two bumpers 50 may be arranged adjacent each other on a lower portion of the ledge 48. It will be appreciated that other bumper arrangements, including spacing and quantity, may also be used.

The front shell 40 may also include a channel 51 for receiving a sealing ring 52 disposed radially inward from the hole pattern for mounting the front shell 40 to the rear shell 42. The sealing ring 52 (shown in FIG. 2) may have a generally rectangular profile corresponding to the shape of the base flange 40b of the front shell 40, with chamfered corners disposed inward from the mounting holes of the front shell 40. The channel 51 has a corresponding shape to receive the sealing ring 52. The sealing ring 52 seals the interior of the outer housing 14, when the front shell 40 and the rear shell 42 are attached together, with the sealing ring 52 being compressed during installation. The sealing ring 52 operates to limit water and other debris from entering the outer housing 14 and reaching the camera core 12.

Figure 15:
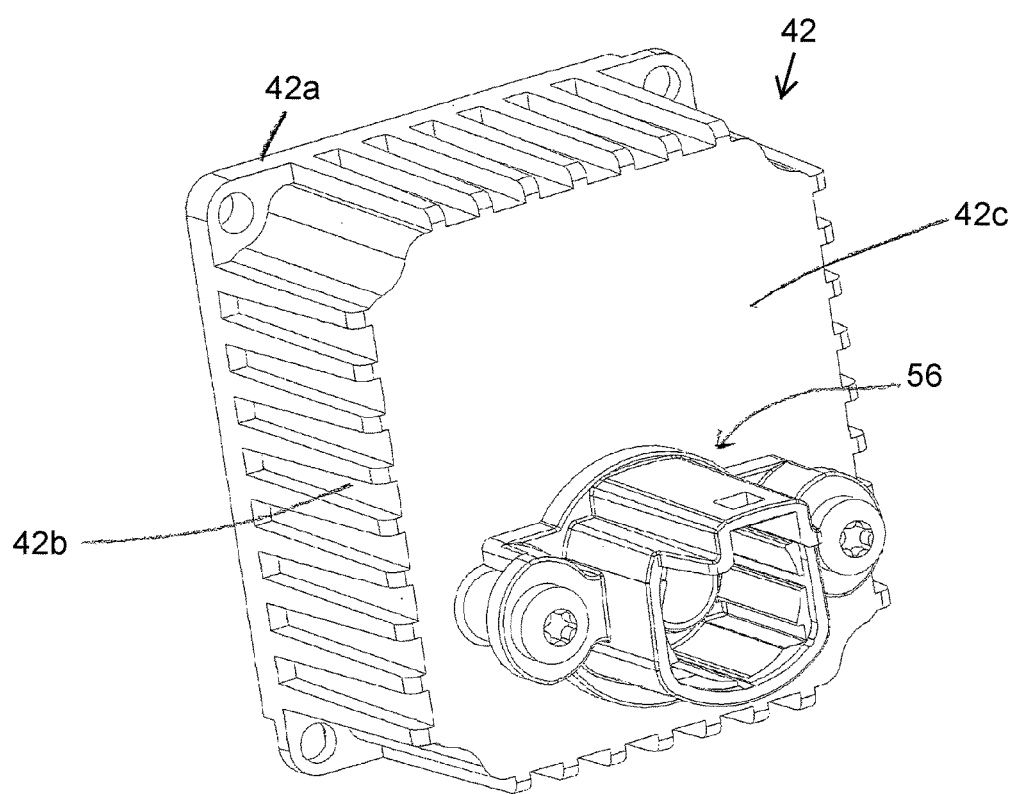
FIG. 15 is a rear perspective view of the rear shell, illustrating a rear port.
Figure 16:
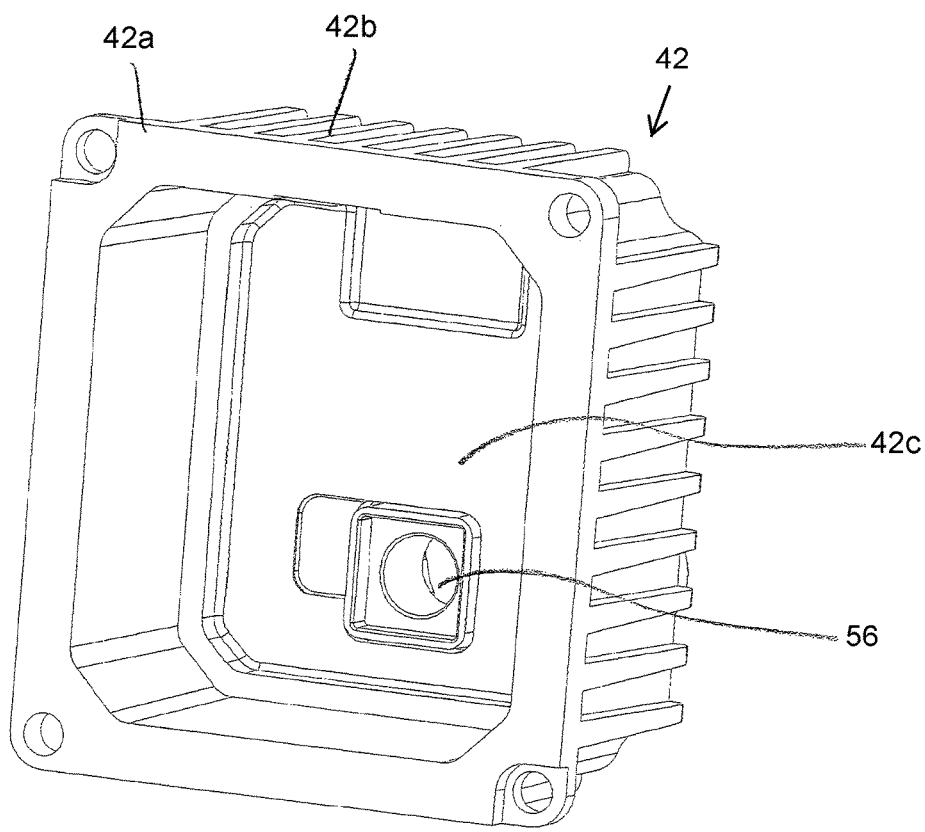
FIG. 16 is a front perspective view of the front shell, illustrating an interior cavity thereof.

With reference now to FIGS. 15 and 16, the rear shell 42 includes a base flange 42a having a generally rectangular shape corresponding to the shape of the base flange 40b of the front shell 40. The base flange 42a of the rear shell 42 includes a hole pattern corresponding to the front shell 40. The rear shell 42 further includes a sidewall 42b extending rearward from the base flange 42a. The sidewall 42 has a generally rectangular box-like shape, with recessed corners to allow for the insertion of fasteners forward toward the mounting holes.

The rear shell 42 further includes rear wall 42*c* extending transverse to the sidewall 42*b* and closing off a majority of the rear end of the rear end of the rear shell 42. The rear shell 42 therefore defines an interior into which the sensor housing 19 of the camera core 12 may be received, with the rear wall covering a majority of the rear end of the camera core 12. The front end of the rear shell 42 is substantially open, allowing for insertion of the camera core 12 and attached components, such as the rear circuit board 36.

The rear wall 42*c* also includes an opening in the form of a port 56. The port 56 protrudes rearward from the rear wall 42*c* and provides access from the interior of the outer housing 14 for connections from the camera core 12 to extend for being further connected with the vehicle controller.

In one form, the rear circuit board 36 includes a connector in the form of a protrusion that corresponds to the shape and location of the port 56. Thus, during assembly, the protrusion of the rear circuit board 36 may extend out through the port 56, allowing for further connections.

The rear shell 42 may include various internal cutouts to accommodate the various shapes of the components attached to the camera core 12. For example, the window heater 46 may attached to the rear circuit board 36 near the top of the outer housing 14, with corresponding hardware and connectors and other structure. In this area of the rear shell 42, the wall of the rear shell 42 may be cut back.

The shape of the rear shell 42 preferably corresponds to the shape of the sensor housing 19, with the sidewall 42*b* of the rear shell defining an opening that corresponds to the size of the sensor housing 19. This arrangement will preferably provide a secure fitting between the rear shell 42 and the sensor housing 19 and provide a locating function to prevent lateral movement of the sensor housing 19 relative to the rear shell 42 when assembled. It will be appreciated that a small amount of clearance may be preferable.

The rear shell 42 may not include any bumpers or grommets or the like. In this approach, the bumpers 50 at the opposite end are flexible enough such that they will compress to provide a sufficient reaction force without damaging the contact between the rear of the camera core 12 or rear circuit board 36 against the rear shell 42. In one form, the rearward protruding connector of the rear circuit board 36 will provide the interface with the rear shell 42.

To secure the camera core 12 within the outer housing, camera core 12 may be inserted into the front shell 40 or the rear shell 42. In the case of embodiments including a window heater 46, the camera core 12 may be inserted into the front shell 40, and the window heater 46 may be connected to the rear circuit board 36. It may be preferably to insert the camera core 12 into the front shell 40 prior to inserting the camera core 12 into the rear shell 42, due to the pin connection between the front shell 40 and the camera core 12.

The rear circuit board 36 may be attached to the camera core 12 either before or after the camera core 12 has been inserted into the front shell 40. When the camera core is inserted into the front shell, the base of the lens housing 20 will be disposed against the ledge 48 and the bumpers 50. At this point, the bumpers 50 may not be compressed.

With the camera core 12 disposed at least partially in the front shell 40, the rear shell 42 may then be attached. If the rear circuit board 36 is not yet attached, the rear circuit board 36 is attached prior to attaching the rear shell 42. With the rear circuit board 36 attached to the camera core 12, other components, such as the heater 46 may then be attached to the rear circuit board 36. Once all components and internal connections have been made, the rear shell 42 may be attached to the front shell 40.

The rear shell 42 is inserted toward and over the camera core 12 and toward the front shell 40. As the rear shell 42 is inserted over the camera core, the protruding connector from the rear circuit board 36 (or other connector or wire harness) is routed or passed through the port 56 of the rear shell 42.

The base flange 42*a* of the rear shell 42 mates with the base flange 40*a* of the front shell 40, with the sealing ring 52 being disposed between the base flanges. The base flange 42*a* of the rear shell may not include a channel for the sealing ring 52, as the sealing ring 52 may be sufficiently held in place by the channel 51 of the front shell 40. As the rear shell 42 is pressed against the front shell 40, the camera core 12 within the outer housing 14 is pressed against the bumpers 50 of the front shell 40. The bumpers 50 provide a reaction force against the camera core 12 pressing the camera core 12 between the front and rear shells 40, 42 and holding the camera core 12 in place.

With the camera core 12 and the outer housing 14 assembled, the camera module 10 is prepared for connection to additional vehicle structure or control systems.

The above described assembly of the camera module 10 may be accomplished with a reduced number of screws. As described above, only four screws 12*a* are used to secure the sensor housing 19 to the lens assembly 16, with the sensor assembly 18 pressed between the sensor housing 19 and the shutter assembly 21 (with the shutter assembly 21 attached to the lens housing 20 via pins). Similarly, only four screws 14*a* are used to secure the camera core 12 within the outer housing 14, where the camera core 12 is placed within the housing and the screws are used to attach the shells 40, 42 of the housing 14 together. In the above described approach, there are no screws internal to the camera core 12 other than the screws that hold the sensor housing 19 to the lens assembly 16. Similarly, there are no other screws inside of the outer housing 14 to secure the camera core within the outer housing 14.

For each of the screws 12*a* and 14*a*, in the above described example, the screws 12*a* and 14*a* are all inserted in a rearward to forward direction. For the above described pins, each of the pins extend in the same front to rear direction in the above described example.

The above described components and assembly provides for a reduced number of fasteners and a more inexpensive and efficient method of assembly.

While the above description constitutes the preferred embodiment of the present invention, it will be appreciated that the invention is susceptible to modification, variation and change without departing from the proper scope and fair meaning of the accompanying claims.

What is claimed is:

1. A camera module assembly comprising:
   an outer housing including a first shell and a second shell;
   wherein the first shell includes a closed end and an open end opposite the closed end, a body extending between the open end and the closed end and defining an interior cavity having a central longitudinal axis, and a base portion disposed at the open end, the base portion defining a plurality of mounting holes therein;
   a camera core assembly including a lens assembly, a sensor assembly, and a sensor housing;
   the lens assembly having a lens housing and a lens module mounted within the lens housing, the lens assembly having a front end and a rear end, the lens assembly front end disposed within the cavity of the outer housing adjacent the closed end, the lens assembly rear end having a base portion with a plurality of mounting holes therein;

the sensor assembly disposed adjacent the base of the lens assembly and defining a plurality of grommet recesses;

the sensor housing having a body with a front end and a rear end and an interior cavity, the sensor housing body defining a plurality of mounting holes corresponding to the mounting holes of the lens assembly, wherein the sensor assembly is disposed within the sensor housing, and the body of the sensor housing is disposed against the lens assembly;

a plurality of grommets disposed within the cavity of the sensor housing, the grommets distributed to correspond to the grommet recesses of the sensor assembly, wherein attachment of the sensor housing to the lens assembly compresses the grommets into the grommet recesses;

wherein the second shell has a front end and a rear end, the second shell front end defining a front opening, the second shell defining an interior cavity, wherein the sensor housing is disposed within the interior cavity of the second shell, a base portion disposed at the front end, the base portion defining a plurality of mounting holes corresponding to the mounting holes of the base portion of the first shell;

wherein the camera core is held in place within the first shell and the second shell by the first and the second shell being fastened together.

2. The assembly of claim 1, further comprising a plurality of bumper members disposed within the interior cavity of the first shell and adjacent a front facing surface of the lens assembly.

3. The assembly of claim 1, further comprising a sealing member extending along a rear surface of the base portion of the first shell and disposed between the first shell and the second shell.

4. The assembly of claim 1, wherein the second shell includes a port formed in the rear end thereof for providing access to the interior cavity of the second shell.

5. The assembly of claim 1, wherein the lens module of the lens assembly is longitudinally adjustable relative to the lens housing to adjust the focus of the lens assembly, wherein the lens module is fixable relative to the lens housing.

6. The assembly of claim 1, further comprising a window disposed at the closed end of the outer housing.

7. The assembly of claim 1, further comprising a heater extending from the closed end of the outer housing to the rear end of the sensor housing, wherein the heater transfers heat from the sensor module to the closed end of the outer housing.

8. The assembly of claim 1, wherein the grommet recesses have a semi-cylindrical shape.

9. The assembly of claim 1, wherein the grommets have a front end, and the front end has a bulbous shape.

10. The assembly of claim 1, wherein the lens assembly includes a shutter assembly attached to the rear end of the lens housing, and the sensor assembly contact the shutter assembly when the camera core assembly is assembled.

11. The assembly of claim 10, wherein the lens housing includes at least one pin extending rearwardly and toward the shutter assembly, and the shutter assembly includes at least one hole corresponding to the at least one pin, wherein the at least one pin of the lens housing is received in the at least one hole of the shutter assembly.

12. The assembly of claim 10, wherein the shutter assembly includes at least one pin extending rearwardly and toward the sensor housing, and the sensor housing includes at least one hole corresponding to the at least one pin, wherein the at least on pin of the shutter assembly is received in the at least one hole of the sensor housing.

13. The assembly of claim 1, wherein the first shell includes at least one pin extending rearwardly, and the lens housing of the camera core assembly includes at least one hole corresponding to the at least one pin of the first shell, wherein the at least one pin of the first shell is received in the at least one hole of the lens housing.

14. The assembly of claim 1, further comprising a rear circuit board disposed between the sensor assembly and the rear end of the second shell, wherein the rear circuit board connects to the sensor assembly via corresponding connectors.

15. The assembly of claim 14, wherein the rear circuit board includes rearwardly protruding connector, and the connector extends through a port formed in the rear end of the second shell.

16. The assembly of claim 1, further comprising:
a plurality of first fasteners having a head portion and a shaft portion, the first fasteners extending through the mounting holes of the sensor housing and the lens assembly in a first direction, such that the head portion is disposed at the rear end of the sensor housing and the shaft portion attaches the lens module to the sensor housing;
a plurality of second fasteners having a head portion and a shaft portion, the second fasteners extending through the mounting holes of the first shell and the mounting holes of the second shell in the same first direction as the first fasteners, such that the head portion is disposed at a rear surface of the base portion of the second outer housing, and the shaft portion attaches the second shell to the first shell.

17. A camera core assembly comprising:
a lens assembly, a sensor assembly, and a sensor housing;
the lens assembly having a lens housing and a lens module mounted within the lens housing, the lens assembly having a front end and a rear end, the rear end having a base portion with a plurality of mounting holes therein;
the lens assembly including a shutter assembly attached to the base portion;
the sensor assembly disposed adjacent the shutter assembly;
the sensor housing having a body with a front end and a rear end and an interior cavity, the body defining a plurality of mounting holes corresponding to the mounting holes of the lens assembly, wherein the sensor assembly is disposed within the sensor housing, and the body of the sensor housing is disposed against the shutter assembly;
a plurality of grommets mounted within the interior cavity of the sensor housing,
wherein the sensor assembly includes a sensor frame defining a plurality of grommet recesses corresponding to the grommets of the sensor housing;
wherein the grommets are compressed between the sensor frame and the sensor housing when the sensor housing is attached to the lens assembly.

18. The assembly of claim 17, wherein the lens housing includes at least one pin and the shutter assembly includes at least one hole correspond to the at least one pin of the lens housing, the shutter assembly includes at least one pin and the sensor frame includes at least one hole corresponding to the at least one pin of the shutter assembly, wherein the at least one pin of the lens housing is received in the at least one hole of the shutter assembly, and the at least one pin of the shutter assembly is received in the at least one hole of the sensor frame.

* * * * *